United States Patent

Lai

[11] Patent Number: 5,934,155
[45] Date of Patent: Aug. 10, 1999

[54] PEDAL CRANK AND BOTTOM BRACKET BEARING AXLE MOUNTING ARRANGEMENT

[76] Inventor: Ching-Jum Lai, No. 28, Kuo-Kou 3rd Lane, Kuo-Kou Tsun, Ta-Tsun Hsiang, Changhua County, Taiwan, R.O.C.

[21] Appl. No.: 09/039,089

[22] Filed: Mar. 13, 1998

[51] Int. Cl.⁶ ................................................ G05G 1/14
[52] U.S. Cl. .................... 74/594.1; 74/594.2; 403/362; 403/381
[58] Field of Search .............................. 74/594.1, 594.2; 403/362, 381

[56] References Cited

U.S. PATENT DOCUMENTS

| | | | |
|---|---|---|---|
| 506,673 | 10/1893 | Crosby | 74/594.2 |
| 584,858 | 6/1897 | Diebel | 74/594.1 |
| 601,710 | 4/1898 | Fay | 74/594.2 |
| 1,010,390 | 11/1911 | Kneeland | 403/381 |
| 3,648,542 | 3/1972 | Perotti et al. | 74/594.1 |
| 4,171,822 | 10/1979 | Thun | 74/594.1 |
| 4,435,103 | 3/1984 | Becker et al. | 403/362 |
| 5,070,662 | 12/1991 | Niese | 403/362 |
| 5,333,964 | 8/1994 | Thomas | 403/381 |
| 5,549,710 | 8/1996 | Vera et al. | 403/362 |

FOREIGN PATENT DOCUMENTS 809689  8/1951  Germany ............................. 403/381

Primary Examiner—John A. Jeffery
Assistant Examiner—Chong H. Kim
Attorney, Agent, or Firm—Rosenberg, Klein & Bilker

[57] ABSTRACT

A pedal crank and bottom bracket bearing axle mounting arrangement in which the bottom bracket bearing axle has a dovetail coupling block at each end; the pedal crank has a dovetail groove at one side near one end which receives the dovetail coupling block at one end of the bottom bracket bearing axle, a sloping hand hole adjacent to the dovetail groove, a screw hole in communication between the dovetail groove and the sloping hand hole, and a tightening up screw threaded into the screw hole and fastened tight to force the inserted dovetail coupling block into engagement with the upper half of the dovetail groove and to hold down the inserted dovetail coupling block in place.

1 Claim, 4 Drawing Sheets

PEDAL CRANK AND BOTTOM BRACKET BEARING AXLE MOUNTING ARRANGEMENT

BACKGROUND OF THE INVENTION

The present invention relates to a pedal crank and bottom bracket bearing axle mounting arrangement, and more particularly to such an arrangement in which the pedal crank is fastened to the bottom bracket bearing axle by a dovetail joint, and then secured in place by a tightening up screw.

FIG. 1 shows a pedal crank and bottom bracket bearing axle mounting arrangement according to the prior art. According to this arrangement, the pedal crank 11 has an eye end coupled to one end of the bottom bracket bearing axle 10 and fixed in place by a lock nut 12. This mounting arrangement has drawbacks. When pedaling the pedal cranks 11, the lock nuts 12 tend to be loosened, thereby causing the pedaling the pedal cranks 11 to vibrate. If the lock nuts 12 fall out of the bottom bracket bearing axle 10, the pedal cranks 11 will drop.

SUMMARY OF THE INVENTION

The present invention has been accomplished to provide a pedal crank and bottom bracket bearing axle mounting arrangement which eliminates the aforesaid problems. It is one object of the present invention to provide a pedal crank and bottom bracket bearing axle mounting arrangement which prevents a vibration of the pedal crank. It is another object of the present invention to provide a pedal crank and bottom bracket bearing axle mounting arrangement which firmly secures the pedal crank to the bottom bracket bearing axle for positive transmission of driving power. According to the present invention, the pedal crank and the bottom bracket bearing axle are fastened together by a dovetail joint, and a tightening up screw is installed to secure the connection between the pedal crank and the bottom bracket bearing axle.

DETAILED DESCRIPTION OF THE PREFERRED EMBODIMENT

Figure 1A:
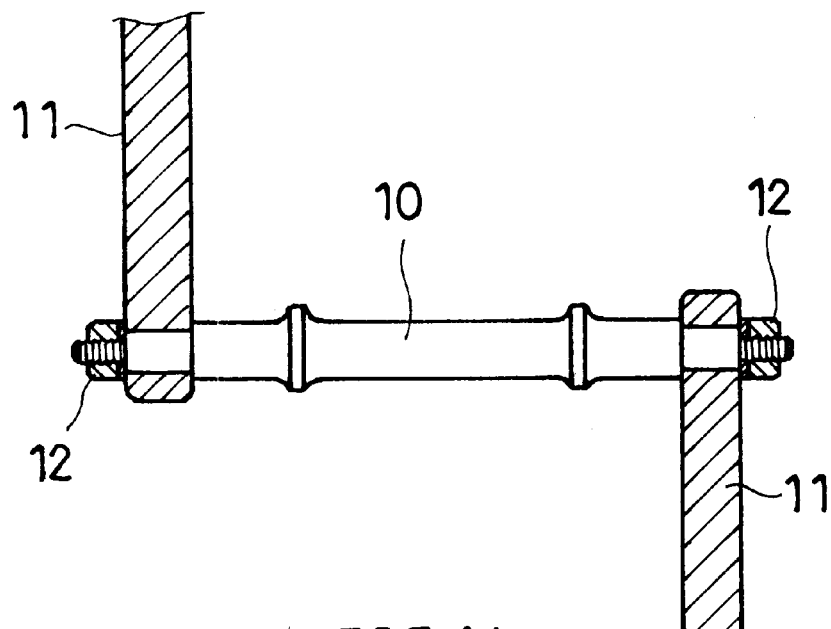
FIG. 1A is a plain view showing two pedal cranks fastened to both ends of a bottom bracket bearing axle according to the prior art.
Figure 1B:
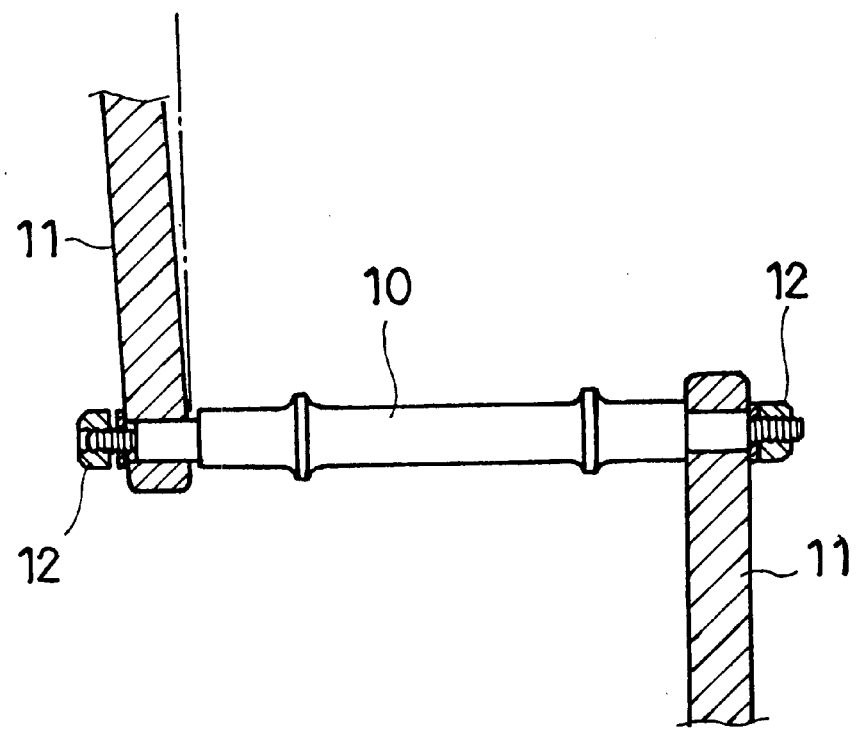
FIG. 1B is similar to FIG. 1A but showing one pedal crank loosened.
Figure 2:
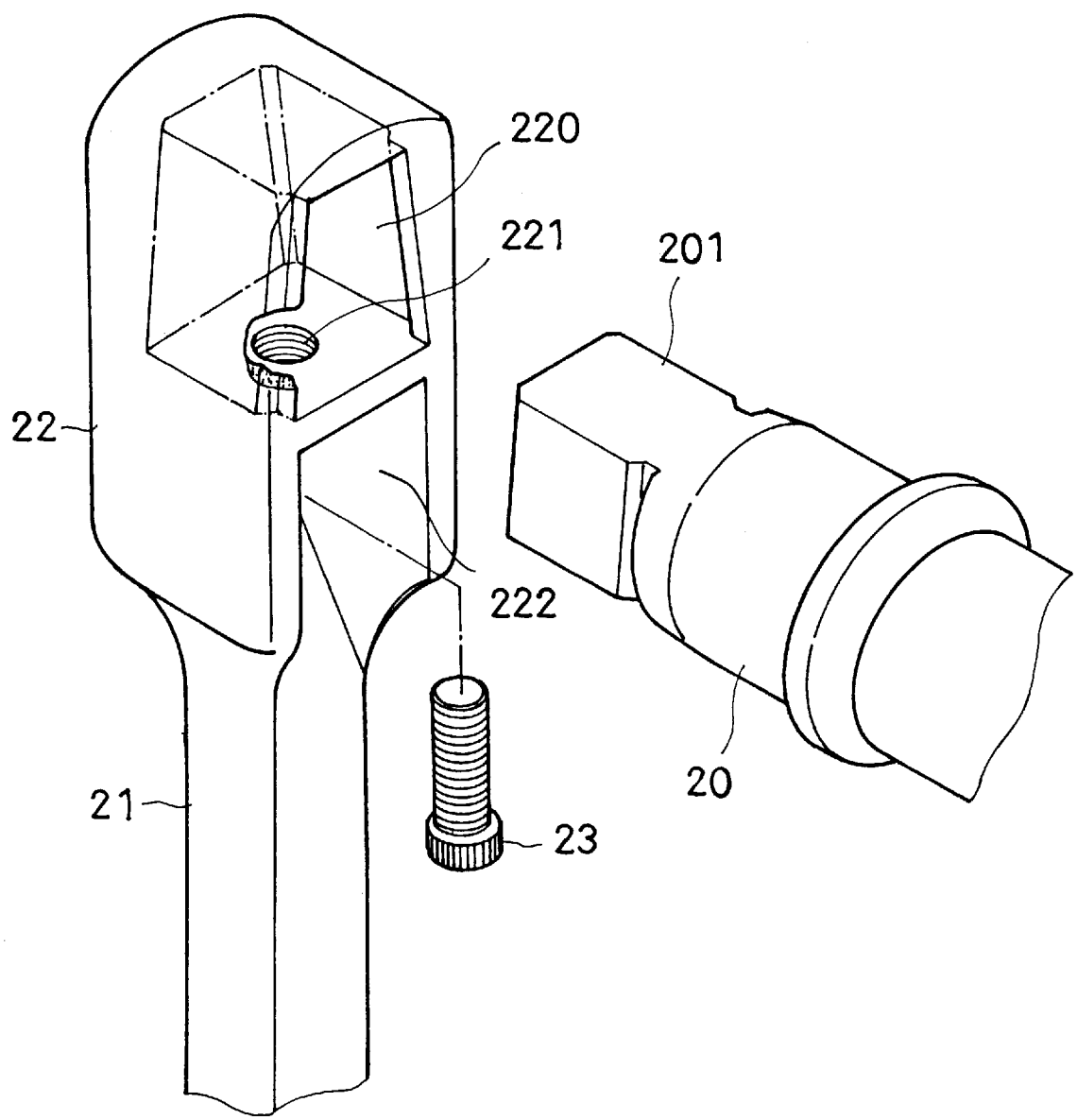
FIG. 2 is an exploded view of the present invention.
Figure 4A:
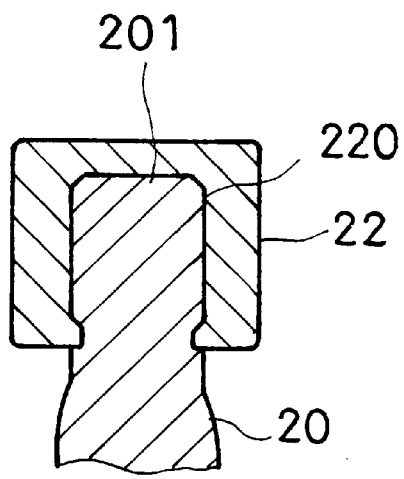
FIG. 4A is a top view of the present invention showing the engagement between the dovetail coupling block of the bottom bracket bearing axle and the coupling block of the pedal crank.
Figure 4B:
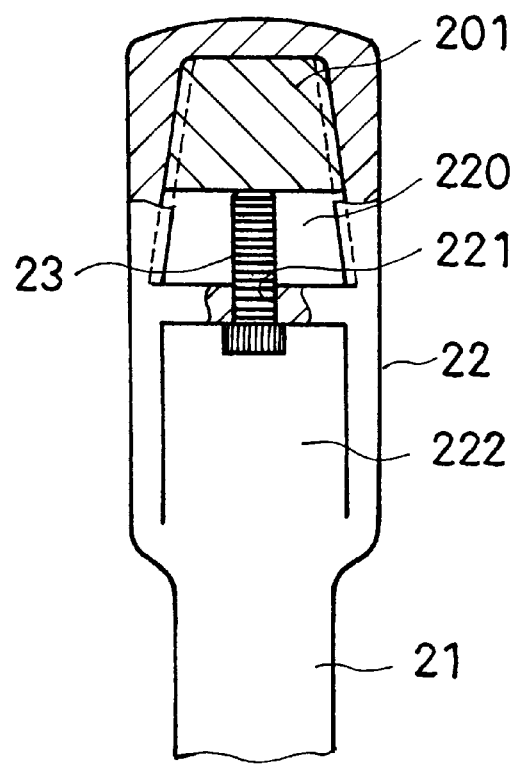
FIG. 4B is a side view of the present invention showing the engagement between the dovetail coupling block of the bottom bracket bearing axle and the coupling block of the pedal crank.

Referring to FIGS. 2, 4A and 4B, a pedal crank 21 is coupled to one end of a bottom bracket bearing axle 20 of a bicycle (the bicycle is now shown). The bottom bracket bearing axle 20 has a dovetail coupling block 201 at each end. The pedal crank 21 has a coupling block 22 at one end for coupling to the dovetail coupling block 201 at one end of the bottom bracket bearing axle 20. The coupling block 22 comprises a dovetail groove 220 and a sloping hand hole 222 at one side at different elevations, and a screw hole 221 in communication between the dovetail groove 220 and the sloping hand hole 222. The dovetail groove 220 is designed to receive the dovetail coupling block 201 at one end of the bottom bracket bearing axle 20. The lower half of the dovetail groove 220 is greater than the size of the dovetail coupling block 201, however, the upper half of the dovetail groove 220 fits the dovetail coupling block 201 perfectly. Further, the hand can be inserted into the sloping hand hole 222 to thread a tightening up screw 23 into the screw hole 221 on the coupling block 22 of the pedal crank 21.

Figure 3A:
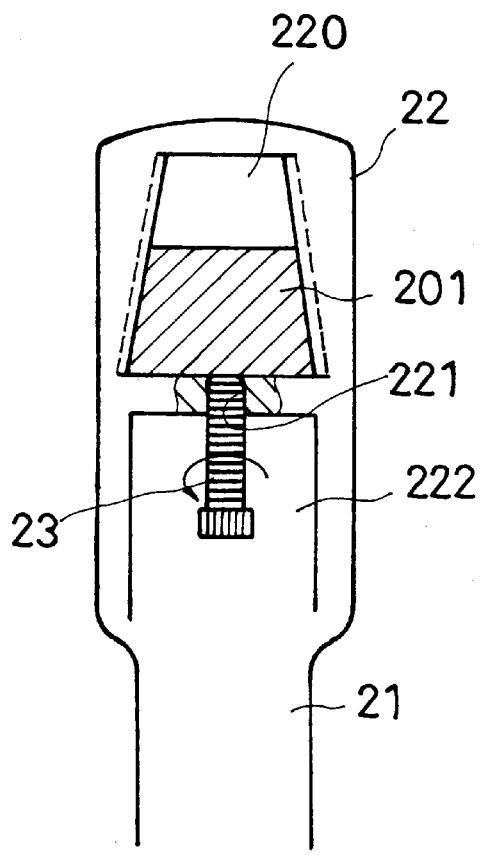
FIG. 3A is a schematic drawing showing the dovetail coupling block inserted into the lower half of the dovetail groove in the coupling block of the pedal crank and the tightening up screw turned inwards according to the present invention.
Figure 3B:
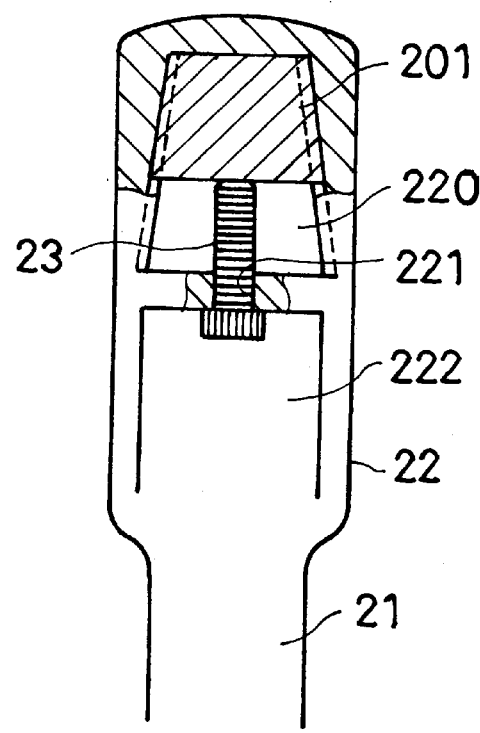
FIG. 3B is similar to FIG. 3A but showing the dovetail coupling block forced into engagement with the upper half of the dovetail groove.

Referring to FIGS. 3A and 3B and FIGS. 4A and 4B again, the dovetail coupling block 201 at one end of the bottom bracket bearing axle 20 is perpendicularly inserted into the lower half of the dovetail groove 220 on the coupling block 22 of the pedal crank 21, and then the tightening up screw 23 is fastened tight to force the dovetail coupling block 201 into engagement with the upper half of the dovetail groove 220 and to hold down the dovetail coupling block 201 in the dovetail groove 220 in the coupling block 22 of the pedal crank 21. After the tightening up screw 23 has been fastened tight, the dovetail coupling block 201 is firmly secured to the coupling block 22 of the pedal crank 21, and therefore the pedal crank 21 and the bottom bracket bearing axle 20 are firmly connected together for positive transmission of driving power from the bicycle rider to the bicycle wheels. When removing the pedal crank 21 from the bottom bracket bearing axle 20 for a repair work, the tightening up screw 23 is loosened, enabling the dovetail coupling block 201 to be moved with the bottom bracket bearing axle 20 downwards from the upper half of the dovetail groove 220 to the lower half thereof, and then disconnected from the coupling block 22 of the pedal crank 21.

What the invention claimed is:

1. A pedal crank and bottom bracket bearing axle mounting arrangement comprising a bottom bracket bearing axle having two ends respectively terminating in a first coupling block, and a pedal crank having a second coupling block at one end coupled to the second coupling block at one end of said bottom bracket bearing axle, wherein the first coupling block at each end of said bottom bracket bearing axle is a dovetail coupling block; the coupling block of said pedal crank comprises a dovetail groove and a sloping hand hole vertically spaced at one end, said dovetail groove having a lower half into which the dovetail coupling block at one end of said bottom bracket bearing axle is inserted, and an upper half for engagement with the dovetail coupling block at one end of said bottom bracket bearing axle, a screw hole in communication between said dovetail groove and said sloping hand hole, and a tightening up screw threaded into said screw hole and fastened tight to force the inserted dovetail coupling block at one end of said bottom bracket bearing axle into engagement with the upper half of said dovetail groove and to hold down the inserted dovetail second coupling block at one end of said bottom bracket bearing axle in the dovetail groove in the coupling block of said pedal crank.

* * * * *